US010632975B2

(12) United States Patent
Strasdat et al.

(10) Patent No.: US 10,632,975 B2
(45) Date of Patent: Apr. 28, 2020

(54) METHOD AND APPARATUS FOR CLEANING AN INTERIOR OF A MOTOR VEHICLE

(71) Applicant: Volkswagen Aktiengesellschaft, Wolfsburg (DE)

(72) Inventors: Bjoern Strasdat, Braunschweig (DE); Silvan Horovitz, Braunschweig (DE); Thanh-Binh To, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/279,976

(22) Filed: Feb. 19, 2019

(65) Prior Publication Data
US 2019/0176769 A1 Jun. 13, 2019

Related U.S. Application Data

(63) Continuation of application No. PCT/EP2017/065983, filed on Jun. 28, 2017.

(30) Foreign Application Priority Data

Aug. 18, 2016 (DE) .................. 10 2016 215 525

(51) Int. Cl.
*B60S 1/64* (2006.01)
*B08B 1/00* (2006.01)
*B08B 5/02* (2006.01)
*B08B 5/04* (2006.01)
*B08B 13/00* (2006.01)
*G06T 7/00* (2017.01)

(52) U.S. Cl.
CPC ............... *B60S 1/64* (2013.01); *B08B 1/002* (2013.01); *B08B 1/006* (2013.01); *B08B 5/02* (2013.01); *B08B 5/04* (2013.01); *B08B 13/00* (2013.01); *G06T 7/001* (2013.01); *G06T 2207/30268* (2013.01)

(58) Field of Classification Search
CPC combination set(s) only.
See application file for complete search history.

(56) References Cited

U.S. PATENT DOCUMENTS

| 6,930,592 | B2 | 8/2005 | Schlecht et al. |
| 8,298,644 | B2 | 10/2012 | Booth |
| 9,994,197 | B2 | 6/2018 | Oh et al. |
| 2006/0076035 | A1 | 4/2006 | McGee et al. |
| 2017/0197315 | A1 | 7/2017 | Haegermarck |

(Continued)

FOREIGN PATENT DOCUMENTS

| DE | 19546756 A1 | 10/1996 |
| DE | 10021905 A1 | 11/2001 |

(Continued)

*Primary Examiner* — Erin F Bergner
(74) *Attorney, Agent, or Firm* — Muncy, Geissler, Olds & Lowe, P.C.

(57) ABSTRACT

A method for cleaning an interior of a motor vehicle, in particular an autonomously drivable motor vehicle, which includes the following steps recording at least one floor area of the interior by means of at least one camera device, determining a level of soiling of the floor area by evaluating the image recorded by the camera device, and cleaning at least the floor area, when the determined level of soiling exceeds a predefinable first limiting value.

14 Claims, 2 Drawing Sheets

(56) References Cited

U.S. PATENT DOCUMENTS

2017/0210352 A1* 7/2017 Stauffer .................. H04W 4/70
2019/0111897 A1* 4/2019 Dowling ................... A47L 7/02

FOREIGN PATENT DOCUMENTS

| | | |
|---|---|---|
| DE | 10229815 A1 | 1/2004 |
| DE | 102014226358 A1 | 6/2006 |
| DE | 1002006000495 A1 | 4/2008 |
| DE | 102011009589 A1 | 8/2011 |
| DE | 102013001332 A1 | 1/2014 |
| DE | 102015004116 A1 | 10/2015 |
| JP | S5826656 A | 2/1983 |
| KR | 1020160016272 A1 | 2/2016 |
| WO | WO2006038747 A1 | 4/2006 |
| WO | WO2006088434 A1 | 8/2006 |
| WO | WO2016005012 A1 | 1/2016 |

\* cited by examiner

METHOD AND APPARATUS FOR CLEANING AN INTERIOR OF A MOTOR VEHICLE

This nonprovisional application is a continuation of International Application No. PCT/EP2017/065983, which was filed on Jun. 28, 2017, and which claims priority to German Patent Application No. 10 2016 215 525.3, which was filed in Germany on Aug. 18, 2016, and which are both herein incorporated by reference.

BACKGROUND OF THE INVENTION

Field of the Invention

The invention relates to a method and an apparatus for cleaning an interior of a motor vehicle, which is designed in particular as an autonomously driving or drivable motor vehicle.

Description of the Background Art

A variety of methods and apparatus for cleaning the interior of a motor vehicle are already known from the state of the art. Thus, for example, German patent application DE 100 21 905 A1 discloses an apparatus for cleaning a motor vehicle interior with a permanently installed suction unit comprising a suction fan, a movable suction line, and a suction head connected thereto. The suction unit is disposed in the vehicle floor area and the suction head is guided approximately parallel to the vehicle floor by the suction line. In this case, a suction process can also be performed automatically without the assistance of a vehicle driver in a time-dependent manner after the driver has left the vehicle. In this case, the suction process is triggered when the driver locks the door, for example, and a seat occupancy detection system rules out that the vehicle seats are occupied. After this has been determined, the cleaning process is performed after a predefinable period of time. Thus, an automatic cleaning process of the motor vehicle or the vehicle floor is carried out by the previously known method. This has the result that a cleaning always takes place when the vehicle is left, and thus even if there is no or only slight soiling of the vehicle floor. This leads to increased wear of the cleaning device and the vehicle floor as well and to increased energy consumption.

SUMMARY OF THE INVENTION

It is therefore an object of the present invention to provide a method and an apparatus which reduces the wear of components required for carrying out the cleaning and ensures an economic cleaning of the vehicle interior, in particular of the vehicle floor.

In an exemplary embodiment, the present invention has the advantage that, in a cost-effective and low-wear manner, the cleaning of the interior of the motor vehicle, in particular of an autonomously drivable/operable motor vehicle, is performed only when it is actually necessary. This is achieved according to an exemplary embodiment of the invention by first recording at least one floor area of the interior by means of at least one camera device, which is in particular permanently installed in the motor vehicle, for example, on the headliner. Next, a level of soiling of the recorded floor area is determined by an evaluation of the floor area image recorded by the camera device. The level of soiling is compared with a predefinable limiting value. If the determined level of soiling exceeds the predefinable limiting value, a cleaning of at least the recorded floor area is carried out. This has the result that, if the vehicle floor or the recorded floor area was not or only slightly soiled, cleaning of the vehicle floor does not occur. As a result, an unnecessary cleaning process is avoided and the wear and energy consumption are reduced overall. In particular, with the increasing electrification of motor vehicles, a load on an electrical energy storage of the motor vehicle is also reduced thereby.

The level of soiling is again determined after the performed cleaning and compared with the predefinable first limiting value or a second, lower predefinable limiting value, wherein the cleaning is performed again if the level of soiling exceeds the first or second limiting value. It is thus provided that after a cleaning is performed, the cleaning result is checked. If the one-time cleaning of the vehicle floor or floor area has not been sufficient, then it will be carried out again automatically. This ensures that the vehicle interior or vehicle floor is reliably cleaned even in the case of greater soiling, so that the next vehicle driver or vehicle occupant subsequently finds a sufficiently clean vehicle floor or vehicle interior. The method is particularly advantageous when it is carried out in an autonomously operable/drivable or self-driving motor vehicle, in which different persons can be the driver or passenger. In particular, the method is of greater advantage in the case of motor vehicles that belong to a vehicle service that lends or leases its autonomously driving or drivable vehicles (for example, in so-called car sharing), because the next renter always finds a cleaned interior space.

Furthermore, it can be provided that, when the level of soiling exceeds the first and/or second limiting value, a message is sent to a central facility on the level of soiling and/or the cleaning performed. In this way, in particular the owner of the motor vehicle or a fleet owner or operator, who has a plurality of such motor vehicles, is informed about the level of soiling and/or the performed cleaning(s). In particular, if a cleaning was unsuccessful and, despite the performed cleaning, the detected level of soiling does not fall below the first and/or second limiting value, a message is sent to the central office about this, so that the motor vehicle can be taken out of operation, for example, and subjected to a separate cleaning.

The level of soiling can be determined by comparing the currently recorded image of the camera device with a reference image. As a result, a particularly simple assessment or determination of the current level of soiling of the vehicle floor or at least the recorded floor area is possible by image evaluation; this is cost-effective and can be carried out in a short time. The reference image used here is preferably a camera device image that was taken before the first use of the motor vehicle. The camera device can be designed to take a two-dimensional or a three-dimensional camera image. If a three-dimensional image is recorded, it can also be provided that the volume of detected objects on the floor area is determined and depending on the detected volume the decision is made about the cleaning measure to be performed. Thus, for example, it can be decided to carry out a wet cleaning in the case of a larger volume, whereas in the case of a smaller volume, a dry cleaning, especially a suction process, is sufficient.

To carry out the cleaning, the floor can be suctioned, wiped, brushed, and/or acted upon by compressed air or a pressurized fluid. This ensures a low-wear and reliable cleaning of the vehicle floor, in particular of the floor area. In particular, the type of cleaning is carried out as a function of the detected level of soiling and/or of a detected type of soiling, so that an improved cleaning result can be achieved.

The apparatus of the invention includes a specifically adapted control unit, which when used as intended performs the method. This results in the aforementioned advantages. In particular, the apparatus has the camera device for recording the floor area and an evaluation device for determining the level of soiling. In addition, the apparatus can have a transmitter device, by means of which the aforementioned message about the level of soiling and/or the performed cleaning can be sent to the central facility if necessary. Further advantages and preferred features and combinations of features emerge in particular from the above and subsequent description and from the claims.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
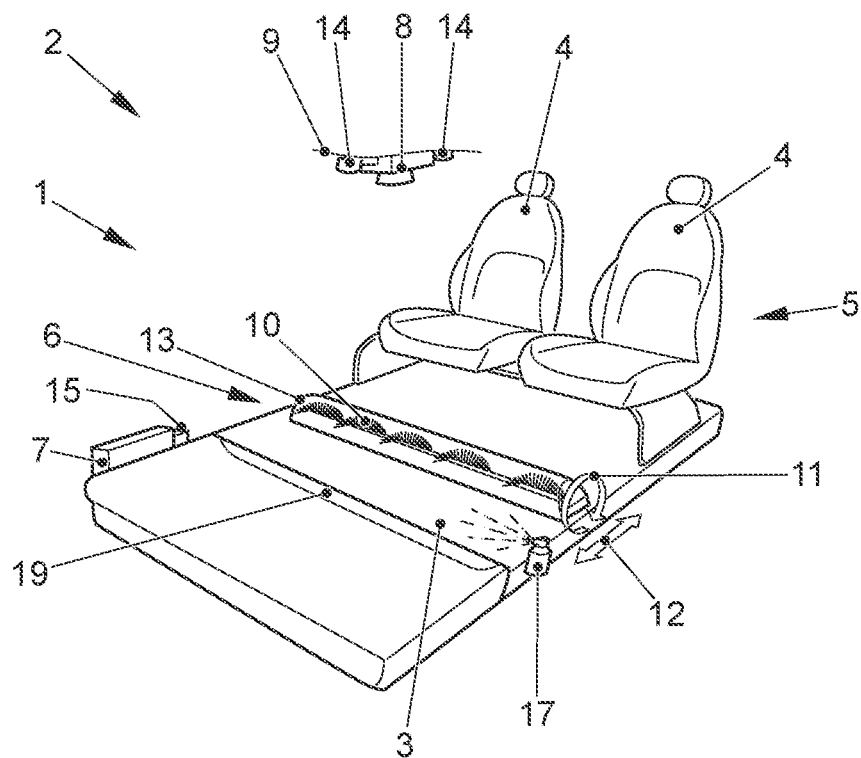
FIG. 1 shows a motor vehicle according to an exemplary embodiment.

FIG. 1 shows in a simplified perspective illustration an interior 1 of a motor vehicle 2 only suggested here. Interior 1 has a vehicle floor 3 on which a plurality of vehicle seats 4 are arranged. According to the present exemplary embodiment, only two vehicle seats 4 of a rear row of seats 5 are shown. Of course, further vehicle seats 4 and/or rows of seats 5 can be arranged on vehicle floor 3.

Furthermore, a cleaning device 6, which is operated by a control unit 7, is disposed on floor 3. Control unit 7 is also connected to a camera device 8, which is disposed on a headliner 9 of motor vehicle 2 and faces vehicle floor 3, so that it records at least one floor area of vehicle floor 3 in terms of imaging.

According to the present exemplary embodiment, cleaning device 6 comprises a brush which extends across the width of vehicle floor 3 and is rotatably mounted about its longitudinal axis, as shown by an arrow 11. In addition, the brush is translationally displaceable in the normal direction of travel of vehicle 2 or opposite to the normal direction of travel of vehicle 2, therefore lastly in the longitudinal extension of vehicle floor 3, as shown by a double arrow 12. The brush is disposed in a housing 13, which covers brush 10 such that the brush, on the one hand, is in contact with vehicle floor 3, and, on the other hand, is covered upwardly by housing 3, so that dust or dirt stirred up by the brush is not flung into vehicle interior 1. Cleaning device 6 is designed such that it can be slid completely under seat row 5, so that it is not visible when not in use.

Control unit 7 monitors the level of soiling of vehicle floor 3 by means of camera device 8. For this purpose, an image of the floor area or of vehicle floor 3 currently recorded by camera device 8 is evaluated, in particular by being compared with a reference image. The reference image was taken, for example, before the motor vehicle was placed in operation, when no soiling has taken place as yet.

To determine the level of soiling, the current image is compared with the reference image. As a result, differences, for example, discoloration or shapes, can be detected in the current image and determined as soiling. Also, for example, a degree of discoloration of the floor area is determined overall, which indicates, for example, an increased dust load or the like. In order to avoid the result from being distorted by sunlight and shadows, it is preferably provided that at least one, in the present case a plurality of light sources 14 for illuminating the floor area to be recorded are associated with camera device 8 and are activated to record the image.

If it is detected in the comparison of the current image with the reference image that the level of soiling exceeds a predefinable first limiting value, cleaning apparatus 6 is then activated to perform a cleaning of vehicle floor 3. For this purpose, brush 10 is set into a rotational movement, according to arrow 11, and is moved over vehicle floor 3 according to double arrow 12, so that the floor is cleaned at least once by brush 10. Brush 10 can alternatively also be designed to be stationary and to be moved only in accordance with double arrow 12 over vehicle floor 3.

Subsequently, an image of the floor area is again recorded by camera device 8 and compared with the reference image. If the level of soiling determined therefrom continues to exceed the first limiting value or a second limiting value which is lower than the first limiting value, cleaning device 6 is actuated again in order to clean vehicle floor 3. Vehicle floor 3 is considered to be sufficiently clean/cleaned only when the cleaning is successful and the level of soiling is below the first or second limiting value.

If, during the determination of the level of soiling, it is recognized that despite the cleaning of vehicle floor 3 the soiling did not decrease or decreased insufficiently, control unit 7 preferably transmits a message by means of a transmitter device 15 about the unsuccessful or insufficient cleaning together with an identification of motor vehicle 2 to a central facility, for example, to an owner or operator of the motor vehicle or the motor vehicle fleet. Thus, the central facility is informed that a particular motor vehicle has an increased level of soiling despite the performed cleaning. Thus, this motor vehicle can be removed from the fleet, for example, and subjected to a separate cleaning.

It is also conceivable, after each performed cleaning, to send a corresponding message by means of transmitter device 15 to the central office, so that it is informed, for example, about the state of use and wear of cleaning device 6. Transmitter device 15 is designed in particular as a mobile radio transmitter.

Figure 2:
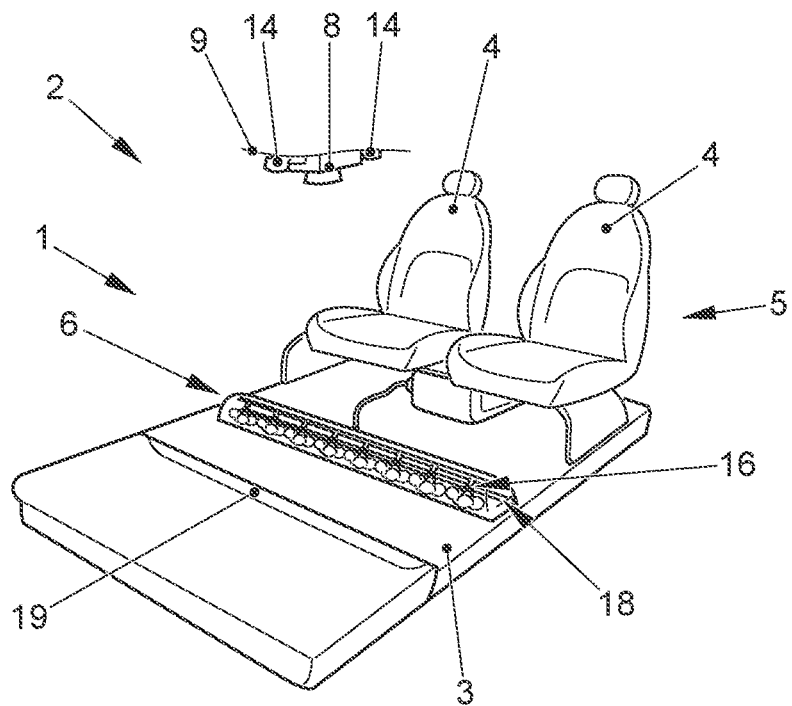
FIG. 2 shows a motor vehicle according to an exemplary embodiment.

FIG. 2 shows a second exemplary embodiment of a motor vehicle 1, wherein elements already known from FIG. 1 are provided with the same reference numerals. The differences mainly will be discussed below.

In contrast to the previous exemplary embodiment, it is provided that, instead of brush 10, cleaning device 6 has a high-pressure cleaner 16 which cleans vehicle floor 3 in a wet manner by means of a liquid, which is applied to vehicle floor 3 under high pressure, therefore, as a pressurized fluid, so that heavier soiling can be removed as well.

Figure 3:
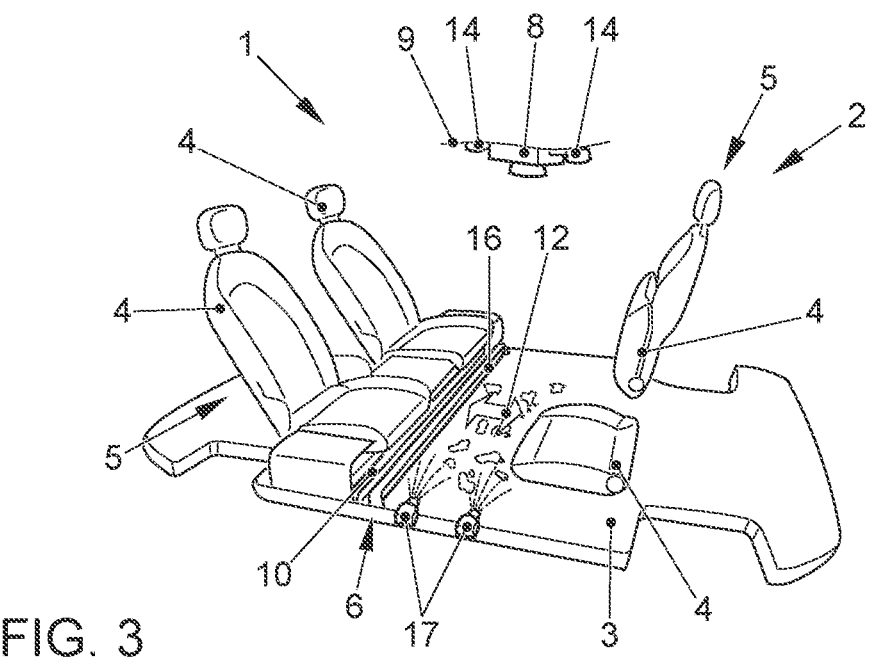
FIG. 3 shows a motor vehicle according to an exemplary embodiment.

FIG. 3 shows a third exemplary embodiment of a motor vehicle 2, wherein here as well elements already known from the preceding exemplary embodiments are provided with the same reference numerals. In this respect, reference is made to the preceding description. The differences mainly will be discussed below.

The third exemplary embodiment differs from the previous exemplary embodiments in that it represents a combination thereof. For this purpose, cleaning device 6 has both a movable brush 10 and a high-pressure cleaner 16. Brush 10 and high-pressure cleaner 6 are basically designed as described above and accordingly each have their own housing 13. To carry out a cleaning, high-pressure cleaner 16 is first moved over vehicle floor 3 and then brush 10 is moved behind it to remove, for example, softened and loosened, but not yet removed, dirt from vehicle floor 3.

In order to assist the cleaning, it is optionally provided that one or more spray nozzles 17 are arranged in vehicle floor 3 and these spray a wiping fluid, in particular a cleaning agent, from the side edge of vehicle floor 3 onto vehicle floor 3. These spray nozzles 17 can also be provided, for example, in the exemplary embodiment according to FIG. 1 in order to improve the action of brush 10. Accordingly, one of the spray nozzles is shown by way of example in FIG. 1.

The spray nozzles of high-pressure cleaner 16 are preferably arranged linearly or perpendicular to the direction of travel in order to loosen the dirt from vehicle floor 3. Instead of the arrangement of spray nozzles 17 on the side edge of vehicle floor 3, therefore, a stationary arrangement, it is also possible to arrange one or more spray nozzles 17 on the respective housing 13 of brush 10 or high-pressure cleaner 16 as well. Housing 13 is used in high-pressure cleaner 16 in particular as a splash guard, which prevents, for example, vehicle seats 4 from being soiled or made wet by, for example, the cleaning agent.

Whereas high-pressure cleaner 16 has been described so far as a high-pressure cleaner that dispenses a liquid cleaning agent, for example, water, at high pressure onto vehicle floor 3, it is also conceivable to design high-pressure cleaner 16 as a compressed air cleaner that cleans vehicle floor 3 of dirt by means of compressed air.

Preferably, housing 13 of high-pressure cleaner 16 and/or brush 10 on a longitudinal side has a wiper lip 18, which together with cleaning device 6 moves the loosened dirt.

In the exemplary embodiments of FIGS. 1 and 2, a dirt trap 19, toward which cleaning device 6 or brush 10 and/or high-pressure cleaner 16 can be moved, is arranged on vehicle floor 3. Dirt trap 19 has a dirt collector which protrudes from vehicle floor 3 and is associated with a slot in vehicle floor 3, so that the dirt transported by cleaning device 6 in the direction of dirt trap 19 falls through the slot. For example, a collecting container for the dirt, which can be emptied automatically or manually, is provided below vehicle floor 3.

Figure 4:
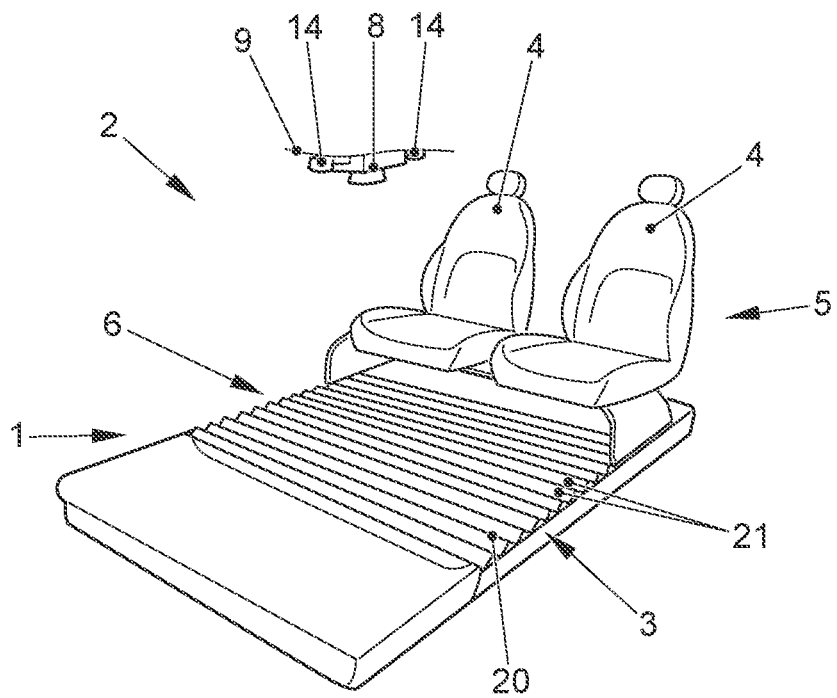
FIG. 4 shows a motor vehicle according to an exemplary embodiment, in each case in a simplified perspective illustration.

FIG. 4 shows a further exemplary embodiment of a motor vehicle 2, wherein elements already known from the preceding figures are provided with the same reference numerals. The differences mainly will be discussed below.

According to the fourth exemplary embodiment shown in FIG. 4, it is provided that cleaning device 6 is designed in the form of an adjustable slat floor 20. Slat floor 20 forms vehicle floor 3 and is formed from a plurality of slats 21, which are each mounted pivotably about their longitudinal axis, so that they form a continuous floor surface in a position of use, and in a cleaning position are raised such that there are open spaces between slats 21. Due to the raising of slats 21, dirt on them is carried in the direction of the open spaces and thereby removed automatically and easily from vehicle floor 3. Here as well, a collecting container is arranged below vehicle floor 3, which then expediently extends over the entire width and length of slat floor 20 and can be emptied automatically or manually.

According to a further exemplary embodiment, it is also conceivable to provide a cleaning robot in vehicle interior 1, which is located, for example, at a charging station in vehicle interior 1 and automatically moves over load floor 3 in order to remove dirt. In this case, the cleaning robot can be controlled by camera device 8, which can specifically guide the cleaning robot to dirt on vehicle floor 3. Expediently, the charging station is located under one of vehicle seats 4, so that the cleaning robot is hidden when not in use or during charging.

Furthermore, it is conceivable that the collecting container is formed below vehicle floor 3 to automatically unload its contents into a large tank or via a drain cover or onto a roadway.

Cleaning device 6 expediently has a tank for storing the liquid cleaning agent. Preferably, it can be filled automatically with a cleaning liquid. For example, the tank is connected to a wiper fluid tank of motor vehicle 2 and can thereby be filled with wiper fluid when necessary.

Camera device 8 preferably has only one camera in order to enable a two-dimensional recording of vehicle floor 3 or of the floor area. Alternatively, it is also conceivable that camera device 8 has a plurality of cameras in order to enable a three-dimensional recording of vehicle floor 3 and/or the separate recording of several areas of vehicle floor 3. The respective camera can be designed to capture an image in the visible or near-infrared region. Thus, light source 14 may be formed, for example, as an infrared radiator, so that the illumination of vehicle floor 3 remains undetected for a user.

By means of camera device 3, pictures of passengers of motor vehicle 2 can also be taken, which can be used for different purposes, such as, for example, identifying the owners of lost/forgotten suitcases or objects, warning of dangerous situations, or determining the person who caused a particular soiling.

Motor vehicle 2 has the advantage that, in particular when it is designed as an autonomously driving or drivable vehicle, it ensures that customers always find a cleaned vehicle interior 1. Because service/rental stations are generally far away from the current place where motor vehicle 2 is used, long travel times result in order to drive motor vehicle 2 to an external cleaning location. During this time, the provider of motor vehicle 2 earns no money, if he uses it, for example, as an autonomously driving taxi. At the same time, customers are usually unwilling to clean motor vehicle 2 itself after use, especially if a large area is to be cleaned and the usage time is proportionally relatively short. The described advantageous embodiments of motor vehicle 2 achieve that vehicle floor 3 can be cleaned automatically without motor vehicle 2 having to be conveyed to an external cleaning location. As a result, the efficiency of the cleaning and use of motor vehicle 2 are increased.

What is claimed is:
1. A method for cleaning an interior of a motor vehicle, the method comprising:
  recording an image of at least one floor area of the interior via at least one camera device;
  determining a level of soiling of the at least one floor area by evaluating the image recorded by the camera device to provide a first determination of the level of soiling; and performing a cleaning of the at least one floor area, when the first determination of the level of soiling exceeds a predefinable first limiting value, wherein a second determination of the level of soiling of the at least one floor area is determined after the cleaning and compared with a second limiting value, the second limiting value being lower than the first limiting value, and wherein the cleaning is performed again if the second determination of the level of soiling exceeds the second limiting value.

2. The method according to claim 1, wherein, when the first or second determination of the level of soiling exceeds the first and/or second limiting value, a message is sent to a central facility on the level of soiling and/or the cleaning performed.

3. The method according to claim 1, wherein the level of soiling is determined by comparing the image recorded by the camera device with a reference image.

4. The method according to claim 1, wherein, to carry out the cleaning, at least the floor area is suctioned, acted upon by compressed air, acted upon by pressurized fluid, wiped, or brushed.

5. An apparatus for cleaning an interior of a motor vehicle, the apparatus comprising:
at least one controllable cleaning device;
at least one camera device for recording an image of at least one floor area of the interior of the motor vehicle; and
a control device configured to perform the method according to claim 1.

6. A motor vehicle comprising an apparatus according to claim 5.

7. The method according to claim 1, wherein to carry out the cleaning, a brush is provided which extends across a width of the at least one floor area, the brush being covered by a housing, such that the brush is disposed between the at least one floor area and the housing, wherein the brush and the housing are displaceable in a direction of travel of the vehicle and opposite to the direction of travel of the vehicle, and wherein when the brush is not in use, the brush and housing are stowed underneath a row of seats of the vehicle, so as to not be visible when not in use.

8. The apparatus according to claim 5, wherein the at least one controllable cleaning device is a brush which extends across a width of the at least one floor area, the brush being covered by a housing, such that the brush is disposed between the at least one floor area and the housing, wherein the brush and the housing are displaceable in a direction of travel of the vehicle and opposite to the direction of travel of the vehicle, and wherein when the brush is not in use, the brush and the housing are stowed underneath a row of seats of the vehicle, so as to not be visible when not in use.

9. The method according to claim 1, wherein to carry out the cleaning, a high pressure cleaner is provided, the high pressure cleaner having spray nozzles that extend across a width of the at least one floor area, the high pressure cleaner being covered by a housing, such that the high pressure cleaner is disposed between the at least one floor area and the housing, wherein the high pressure cleaner and the housing are displaceable in a direction of travel of the vehicle and opposite to the direction of travel of the vehicle, and wherein when the high pressure cleaner is not in use, the high pressure cleaner and the housing are stowed underneath a row of seats of the vehicle, so as to not be visible when not in use.

10. The apparatus according to claim 5, wherein the at least one controllable cleaning device is a high pressure cleaner, the high pressure cleaner having spray nozzles that extend across a width of the at least one floor area, the high pressure cleaner being covered by a housing, such that the high pressure cleaner is disposed between the at least one floor area and the housing, wherein the high pressure cleaner and the housing are displaceable in a direction of travel of the vehicle and opposite to the direction of travel of the vehicle, and wherein when the high pressure cleaner is not in use, the high pressure cleaner and the housing are stowed underneath a row of seats of the vehicle, so as to not be visible when not in use.

11. The method according to claim 7, wherein to carry out the cleaning, a high pressure cleaner is provided in addition to the brush, the high pressure cleaner having spray nozzles that extend across the width of the at least one floor area, the high pressure cleaner being covered by another housing, such that the high pressure cleaner is disposed between the at least one floor area and the another housing, wherein the high pressure cleaner and the another housing are displaceable in the direction of travel of the vehicle and opposite to the direction of travel of the vehicle, and wherein the high pressure cleaner is disposed in front of the brush in the direction of travel of the vehicle, such that the high pressure cleaner interacts with soiling of the at least one floor area prior to the brush.

12. The apparatus according to claim 8, wherein the at least one controllable cleaning device further includes a high pressure cleaner, the high pressure cleaner having spray nozzles that extend across the width of the at least one floor area, the high pressure cleaner being covered by another housing, such that the high pressure cleaner is disposed between the at least one floor area and the another housing, wherein the high pressure cleaner and the another housing are displaceable in the direction of travel of the vehicle and opposite to the direction of travel of the vehicle, and wherein the high pressure cleaner is disposed in front of the brush in the direction of travel of the vehicle, such that the high pressure cleaner interacts with soiling of the at least one floor area prior to the brush.

13. The method according to claim 11, wherein, to carry out the cleaning, side spray nozzles are provided in addition to the high pressure cleaner and the brush, the side spray nozzles being positioned at side edges of the at least one floor area, and wherein the side spray nozzles spray a cleaning agent.

14. The apparatus according to claim 12, wherein the at least one controllable cleaning device further includes side spray nozzles in addition to the high pressure cleaner and the brush, the side spray nozzles being positioned at side edges of the at least one floor area, and wherein the side spray nozzles spray a cleaning agent.

* * * * *